United States Patent [19]

Newell et al.

[11] Patent Number: 4,664,588

[45] Date of Patent: May 12, 1987

[54] APPARATUS AND METHOD FOR CONNECTING AND EXCHANGING REMOTE MANIPULABLE ELEMENTS TO A CENTRAL CONTROL SOURCE

[75] Inventors: Bruce D. Newell, Schenectady; Thomas J. Petronis, Clifton Park; Lawrence R. Krause, Niskayuna, all of N.Y.

[73] Assignee: Applied Robotics Inc., Latham, N.Y.

[21] Appl. No.: 814,600

[22] Filed: Jan. 3, 1986

Related U.S. Application Data

[63] Continuation of Ser. No. 588,080, Mar. 9, 1984.

[51] Int. Cl.$^4$ ............................................. F16B 21/00
[52] U.S. Cl. .................................... 414/730; 901/29; 901/41
[58] Field of Search ........................... 285/24–29, 285/93, 137.1, DIG. 920, 119, 33, 35, 80, 305, 308–310, 320; 403/322, 325, 326, 327, 49, 321; 414/1–8, 729, 730; 901/14, 29, 30, 41, 50, 35

[56] References Cited

U.S. PATENT DOCUMENTS

| | | | |
|---|---|---|---|
| 2,476,249 | 7/1949 | Payne, Jr. ............................. | 414/4 |
| 2,803,473 | 8/1957 | Hohmann .............................. | 284/18 |
| 2,861,701 | 11/1958 | Bergsland et al. .................. | 901/30 X |
| 3,063,032 | 11/1962 | Brush .................................... | 339/45 |
| 3,066,805 | 12/1962 | Sullivan ................................ | 214/1 |
| 3,163,223 | 12/1964 | Bauer et al. ......................... | 166/66.5 |
| 3,171,549 | 3/1965 | Orloff .................................... | 214/1 |
| 3,195,095 | 7/1965 | Field ..................................... | 339/16 |
| 3,247,978 | 4/1966 | Neumeier ........................... | 901/29 X |
| 3,247,979 | 4/1966 | Melton et al. ....................... | 214/1 |
| 3,280,991 | 10/1966 | Melton et al. ....................... | 214/1 |
| 3,433,370 | 3/1969 | Eisert et al. ......................... | 214/1 |
| 3,551,005 | 12/1970 | Brun ..................................... | 285/10 |
| 3,602,869 | 8/1971 | Metz et al. ........................... | 339/15 |
| 3,624,721 | 11/1971 | Workman, Jr. ..................... | 285/93 X |
| 3,661,408 | 5/1972 | Gibbons ............................. | 285/920 X |
| 3,673,541 | 6/1972 | Volinskie ............................. | 339/16 |
| 3,701,549 | 10/1972 | Koomey et al. .................... | 285/24 |
| 3,759,563 | 9/1973 | Kitamura ............................. | 294/88 |
| 3,817,281 | 6/1974 | Lewis et al. ......................... | 137/594 |
| 3,820,600 | 6/1974 | Baugh .................................. | 166/6 |
| 3,904,234 | 9/1975 | Hill et al. ............................. | 294/106 |
| 4,011,437 | 3/1977 | Hohn ..................................... | 235/151 |
| 4,080,025 | 3/1978 | Garnier ................................ | 339/16 |
| 4,227,853 | 10/1980 | Woodford et al. ................. | 414/4 X |
| 4,365,928 | 12/1982 | Baily ..................................... | 414/735 |
| 4,370,091 | 1/1983 | Gagliardi ............................ | 414/735 |
| 4,411,454 | 10/1983 | Nayler et al. ....................... | 285/26 |
| 4,488,241 | 12/1984 | Hutchins et al. ................... | 364/513 |

FOREIGN PATENT DOCUMENTS

| | | | |
|---|---|---|---|
| 2120634 | 12/1983 | United Kingdom ................ | 403/19 |
| 543513 | 3/1977 | U.S.S.R. ............................... | 901/30 X |

OTHER PUBLICATIONS

J. Gupton, "Nuclear Power Plant Emergency Damage Control Robot", *Robotics Age*, Mar./Apr. 1983, pp. 18–21.

*Primary Examiner*—Joseph E. Valenza
*Assistant Examiner*—D. Glenn Dayoan
*Attorney, Agent, or Firm*—Thomas L. Secrest; Charles B. Smith

[57] ABSTRACT

An exchange system is provided for connecting a remote, manipulable element, such as a robot arm tool gripper, to a central control source, such as a robot arm and its associated programmable control. An upper exchange unit attaches to the robot arm and receives control signals which pass through the body of the upper unit to a matable lower exchange unit. A plurality of lower exchange units are provided, each attached to an individual tool gripper and relaying control signals to the gripper. The mating upper and lower exchange units provide for serial connection of the robot arm to any desired one of an array of tool grippers and for communication of control signals through the mated units to each tool gripper without the need for separate control umbilicals between each tool gripper and the control signal source.

11 Claims, 7 Drawing Figures

FIG. 3
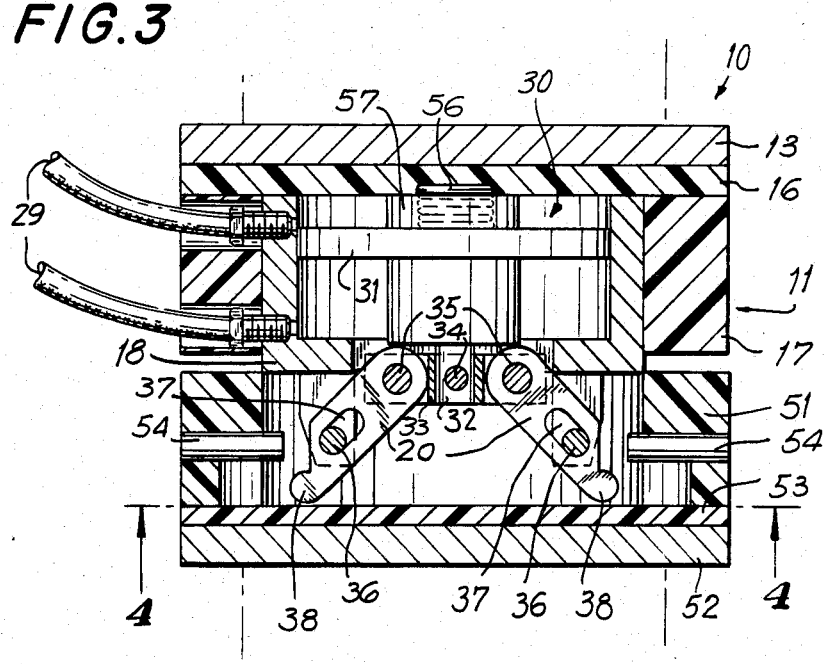
FIG. 5
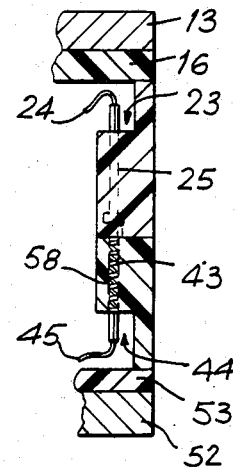
FIG. 4

APPARATUS AND METHOD FOR CONNECTING AND EXCHANGING REMOTE MANIPULABLE ELEMENTS TO A CENTRAL CONTROL SOURCE

This is a continuation of application Ser. No. 588,080, filed Mar. 9, 1984, entitled Apparatus and Method for Connecting and Exchanging Remote Manipulable Elements to a Central Control source.

BACKGROUND OF THE INVENTION

This invention relates to a connector system for automatically connecting any one of a plurality of remote manipulable elements to a central control unit. More particularly, this invention is directed to an exchange unit capable of effecting automatic connection between a robot arm and a desired tool gripper selected from an array of tool grippers.

Robot arms and tool grippers are well known in the art. However, prior art systems suffer from the shortcoming that either the tool gripper is fixedly attached to the robot arm, as by screws, or that each tool gripper in a set, although connectable to and separable from the robot arm, requires its own separate umbilical cording for control distinct from that of the robot arm, with the result that there is a cumbersome and messy duplication of control input conduits.

SUMMARY OF THE INVENTION

The tool gripper connection system of this invention is capable of joining a robot arm with any one of a plurality of tool grippers without the need for separate control input umbilicals to the gripper. It further provides the capability of automatically exchanging the selected tool gripper for any other gripper in a given array. The system includes an upper exchange unit fixed to the robot arm and a plurality of mating lower exchange units each fixed to a respective one of the array of tool grippers. The mating upper and lower exchange units provide for communication of the tool gripper control signals through the mated exchange unit so that the selected tool gripper may be controlled without the need for a separate set of control conduits between each gripper and the control signal source.

It is an object of this invention to provide a robot arm tool gripper exchange system so that the robot arm can automatically mate with a succession of tool grippers and thus perform operations requiring different tools.

It is another object of this invention to provide a robot arm tool gripper exchange system that is lightweight so that it consumes a minimum amount of the available robot arm work capacity.

It is a further object of this invention to provide a robot arm tool gripper exchange system that eliminates the need for duplicate control umbilicals between each tool gripper and the control signal source.

These and other objects and advantages of this invention may be seen in the following description taken in conjunction with the drawings.

BRIEF DESCRIPTION OF THE DRAWINGS

FIG. 3 is a sectional view of the exchange units taken along line 3—3 of FIG. 2 and further showing partial mating of the units.

FIG. 4 is a sectional view of the mated exchange units taken along line 4—4 of FIG. 3.

FIG. 5 is a partial sectional view taken along line 5—5 of FIG. 2 showing annular recesses in the exchange units.

DETAILED DESCRIPTION OF THE PREFERRED EMBODIMENT

Figures 1, 2:
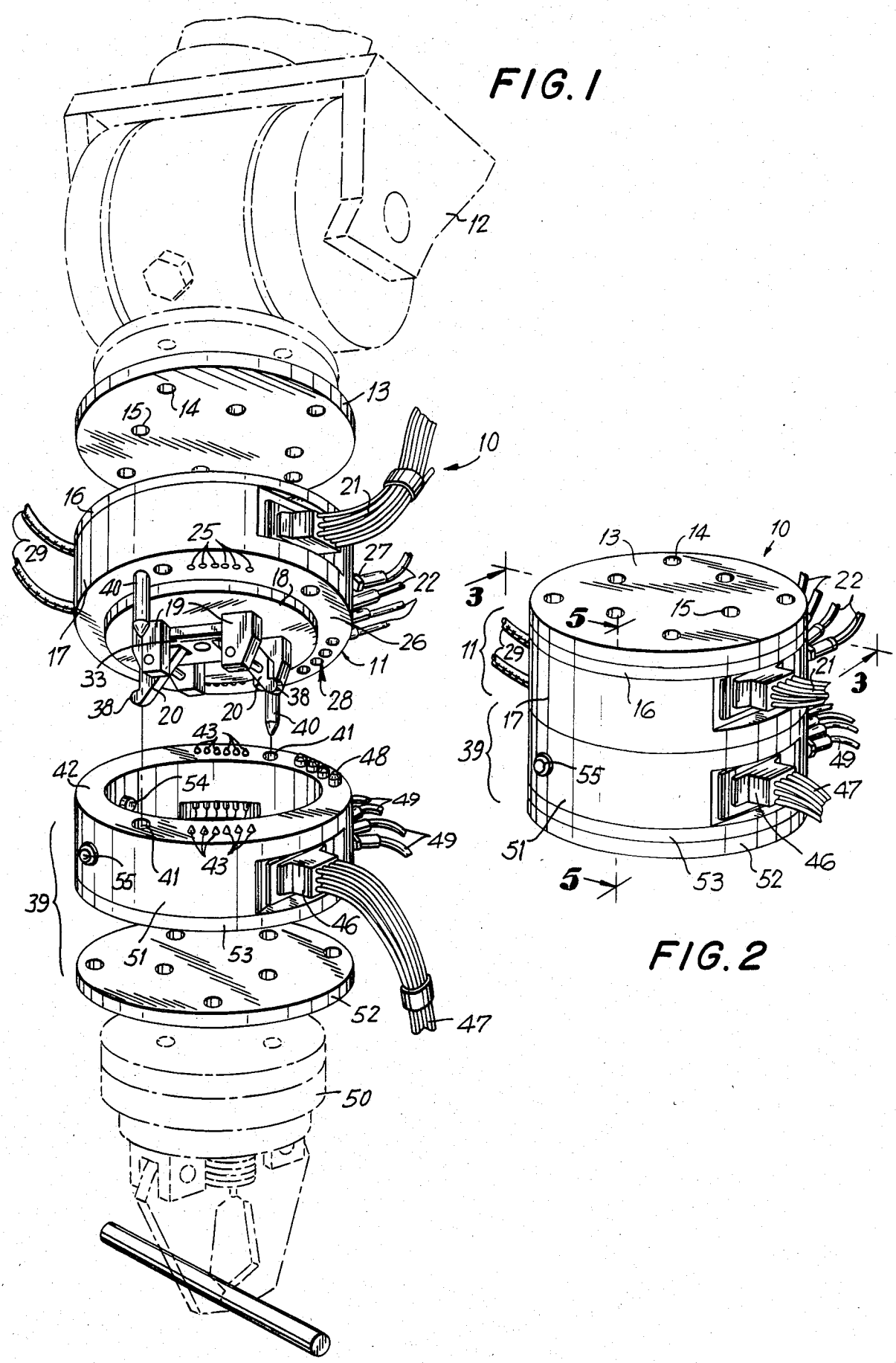
FIG. 1 is an exploded, three-dimensional view of the elements of the tool gripper exchange unit.
FIG. 2 is a view of the mated upper and lower exchange units.
Figure 6:
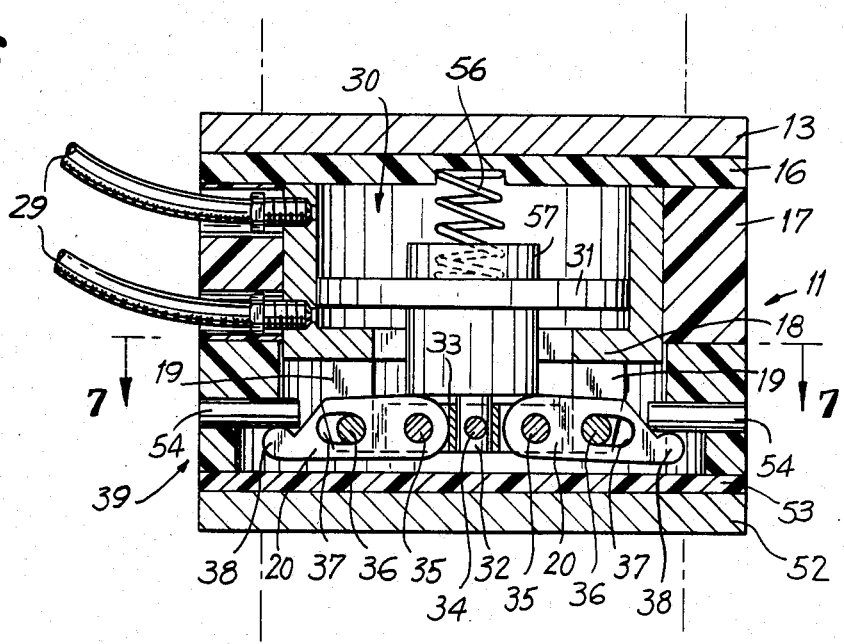
FIG. 6 is a sectional view similar to FIG. 3 and showing the exchange units locked together.
Figure 7:
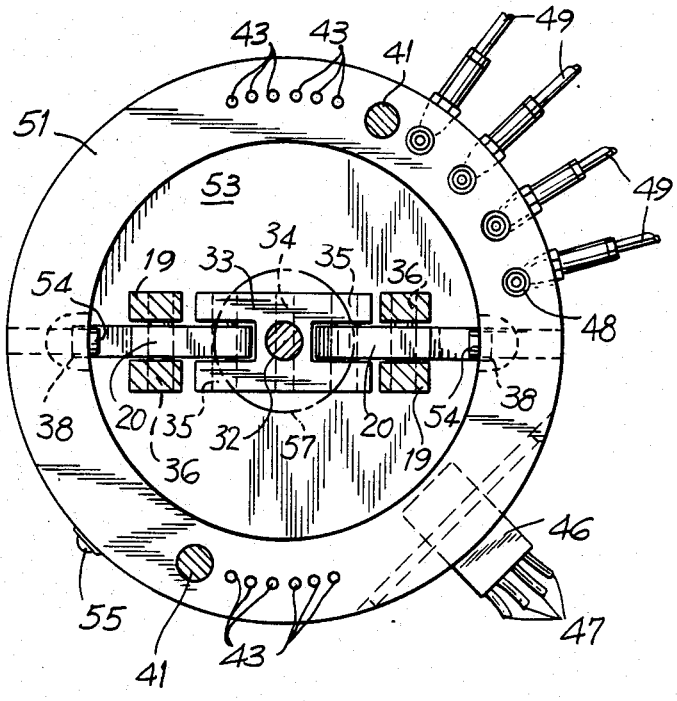
FIG. 7 is a sectional view taken along line 7—7 of FIG. 6.

The exploded view of the tool exchange system 10 shows its major components. An upper exchange unit 11 is attached to a robot arm 12 by means of an adapter plate 13. The adapter plate 13 is of the same diameter as the upper exchange unit 11 and has threaded holes 14 for attachment to upper exchange unit 11 by means of screws. Countersunk holes 15 are located on the adapter plate 13 as required for attachment of the adapter plate to a particular robot arm. As robot arms of various manufacturers have varying screw hole locations for tool attachment, holes 15 are varied for each different manufacture. Adapter plate 13 is preferably made of lightweight metal to provide for secure threading of the screw holes while minimizing weight.

The body of upper exchange unit 11 includes a top plate 16, a cylindrical housing 17 and bottom plate 18. Mounts 19 for lifting fingers 20 are attached to and project downwardly from bottom plate 18. Upper exchange unit housing 17 is preferably formed of lightweight plastic and has receptacles for receiving input control signals, here depicted as a plurality of electrical wires 21 and pneumatic hoses 22 from a remote control source (not shown). The plastic body of housing 17 provides electrical insulation between the electrical connector elements 25. If desired, housing 17 could be formed of lightweight metal or other such noninsulative material. Such construction would require insulating sheaths around connector elements 25.

Internally, upper exchange unit housing 17 has an annular recess 23 for passage of electrical control conduits 24 to desired locations about its circumference where they join vertical female connector elements 25 for passage to the face 26 of the housing. Pneumatic input control ports 27 intersect vertical bored conduits 28 in the wall of upper exchange unit housing 17 for communication with housing face 26. Additional inputs 29 communicate with the coupling drive unit 30. In the preferred embodiment shown, coupling drive unit 30 is a double acting pneumatic cylinder having a pneumatic input directed to each respective face of piston 31.

If desired, a compression spring 56 may be mounted between the top of piston rod 57 and the lower face of plate 16 to provide fail-safe mating of the exchange units in the event of a loss of air pressure to pneumatic inputs 29. The initial force of the spring 56 should be selected to be great enough to hold piston 31 in its fully downward position without the maintenance of air pressure on pneumatic cylinder 30, while the compressed force should be not so great as to substantially inhibit retraction of piston 31 by air pressure delivered to cylinder 30 in normal operation. Alternatively, pneumatic inputs 29 may be provided with spring return blocking ports to maintain air pressure on cylinder 30 if the source of air pressure fails.

Output shaft 32 of pneumatic cylinder 30 passes through a hole in bottom plate 18 and has attached to it a yoke 33 by means of pivot pin 34. At each end of yoke 33 is mounted a lifting finger 20 by means of pivot pin 35. Lifting finger 20 is further connected to mount 19 by slide pin 36 which passes through elongated slot 37 in finger 20, so that a portion of the downward stroke of piston 31 and output shaft 32 is translated into lateral movement of hook 38 at the lower end of finger 20 during mating of upper exchange unit 11 with lower exchange unit 39.

Upper exchange unit 11 also has bullet-nosed guide pins 40 projecting downwardly from its face 26 for general registry with alignment holes 41 in the face 42 of lower exchange unit 39 during mating. Guide pins 40 preferably extend farther from face 26 of upper exchange unit 11 than any other element to avoid damage to other elements of the upper or lower unit in the event of misalignment.

Lower exchange unit 39 is preferably formed of the same materials as upper exchange unit 11 and has about the circumference of its upper face 42 spring-loaded male control connections 43 for mating with the corresponding female connections 25 on the face of upper exchange unit 11. Spring-loading of connections 43 is preferably accomplished by axially disposed coil springs 58 (FIG. 5). Lower exchange unit 39 includes housing 51, adapter plate 52 for attaching the unit to a tool gripper 50, and bottom plate 53. Like upper exchange unit housing 17, lower exchange unit housing 51 is preferably formed of plastic and so provides electrical insulation between electrical connector elements 43. If housing 51 is formed of noninsulative material, connector elements 43 would require insulating sheaths.

Internally, lower exchange unit 39 has an annular recess 44 corresponding to upper exchange unit recess 23 for passage of electrical control conduits 45 from male connectors 43 to output plug 46 for further relay through electrical wires 47 to the tool gripper 50. Similarly, lower exchange unit 39 has bored conduits passing vertically through its wall to connect male pneumatic connectors 48 with pneumatic control output conduits 49 for passing pneumatic signals to tool gripper 50. Male connectors 48 preferably have an "O" ring seal, while female connectors 28 on upper exchange unit 11 are slightly chamfered, thus providing a secure, leak free pneumatic connection upon mating of the units.

Male connectors rather than female are preferably located on the face 42 of lower exchange unit 39 to avoid collection of dust, dirt or other foreign matter which could readily occur on upwardly facing female connectors during storage. Alignment hole 41 is preferably on lower exchange unit 39 to facilitate visual alignment of that hole with guide pin 40 by an operator during initial set-up of the system, and may be bored completely through the lower exchange unit housing 51 and adapter plate 52 to avoid collection of foreign matter.

Lower exchange unit 39 also has locking pins 54 mounted in its wall and extending radially inwardly. Locking pins 54 are located so as to align with hooks 38 at the outer ends of lifting fingers 20 during mating. These pins are preferably made of hardened steel or similar material.

Bottom plate 53 of lower exchange unit 39 is preferably formed of lightweight metal and attaches to lower adapter plate 52. Lower adapter plate 52 is bored similarly to upper adapter plate 13 for attachment of lower exchange unit 39 to a tool gripper 50.

The spring-loaded male electrical connectors 43 preferably extend upwardly about 0.06 to 0.08 inch beyond the upper face 42 of the lower exchange unit 39. Two of these connectors are preferably connected through their respective female connectors 25 to an input current and a ground and are wired in parallel to coupling position indicator 55, which is preferably a low power LED display.

In operation of the tool gripper exchange system, each tool gripper 50 of an array of grippers has an associated lower exchange unit 39 connected to it by lower adapter plate 52 and control signal umbilicals 47 and 49. The tool grippers are preferably stored in an appropriate rack in a convenient orientation, usually vertically, for pick up by the robot arm 12 and associated upper exchange unit 11. Thus, for example, an array of four tool grippers for performing four different operations would normally utilize four lower exchange units matable seriatim with one upper exchange unit.

One upper exchange unit 11 is attached to the robot arm by adapter plate 13, and its associated control signal umbilicals 21 and 22 are connected to a remote signal source (not shown), which may or may not be an integral part of the robot arm 12. During set-up of the system, an operator manipulates the robot arm 12 to locate the upper exchange unit 11 above the desired tool gripper and its associated lower exchange unit 39 stored in an appropriate rack, aligning bullet-nosed pins 40 with alignment holes 41. He then moves the upper exchange unit toward the lower exchange unit. As the units almost touch, the male electrical connectors 43 protruding beyond the upper face 42 of the lower exchange unit 39 contact their respective female connectors 25, thus energizing the coupling position indicator 55. At this point, the operator stops robot arm movement of the upper exchange unit and signals pneumatic input 29 to pressurize the drive cylinder 30, driving lifting fingers 20 downward and outward to engage locking pins 54. Although robot arm movement has stopped, drive cylinder 30 continues to drive output shaft 32 causing lifting fingers 20 to lift upward on pins 54, pulling the lower exchange unit 39 into secure connection with the upper exchange unit 11 without any harsh striking between the faces of the exchange units. Because the yoke 33 holding lifting fingers 20 is pivotally mounted on piston output 32, lifting forces tend to equalize on pins 54.

Once this mating operation has been programmed into the central control source by the operator during set-up of the system, it thereafter may be carried out automatically on programmed signals from the central control source. The sequence of events described above for mating of the units remains the same, the only difference being that there is no requirement for manual input by the operator.

When a particular tool gripper is to be released, it is positioned in an appropriate rack and a pneumatic signal is delivered against the lower face of drive piston 31 of cylinder 30, retracting output shaft 32 and so also retracting lifting fingers 20. Additionally, the lower surfaces of fingers 20 interfere slightly with bottom plate 53 of lower exchange unit 39 (FIG. 3) and this interference assists in urging the exchange units apart.

Once initial set-up for mating and disengaging of each tool gripper in the array is accomplished, those functions may be controlled automatically by an appropriate programmed control source.

We claim:

1. A manipulator tool exchange sytem, comprising:
   a. a lightweight first exchange unit attachable to and in signal communication with a central control source and having control signal conducting means passing therethrough;
   b. at least one lightweight second exchange unit matable with and releasably connectable to the first exchange unit and attachable to and in control signal communication with a remote manipulable element, the second exchange unit having control signal conducting means passing therethrough and matable with the first exchange unit for passing of control signals to the remote manipulable element; and
   c. locking means, internal to the first exchange unit, in signal communication with and responsive to the central control source for connecting and disconnecting the matable exchange units, the locking means comprising a plurality of latch means, pivotally connected to an axially moveable drive means and slidable on a pin fixed in a mount to engage latch retaining means in response to signals from the central control source to the drive means to engage and disengage on command, the matable exchange units.

2. The exchange system of claim 1 wherein the latch means slide and pivot in response to the drive means to (a) engage the latch retaining means prior to mating of the first exchange unit and the second exchange unit and (b) upon further sliding and pivoting, lift the second exchange unit into secure mating contact with the first exchange unit.

3. The exchange system of claim 2 wherein the drive means comprises a double-acting pneumatic cylinder and piston output shaft.

4. The exchange system of claim 3 wherein the latch means are pivotally connected to a yoke and slidably connected to a mount, the yoke being pivotally mounted to the output shaft, which pivotal mounting of the yoke serves to equalize lifting forces exerted on the latch retaining means during mating of the first and second exchange units.

5. The exchange system of claim 1 wherein the matable control signal conducting means includes spring-loaded contact elements mounted in the face of at least one of the exchange units.

6. The exchange unit of claim 1 or 5 wherein the locking means comprises means for lifting the second exchange unit into secure mating contact with the first exchange unit.

7. The exchange system of claim 5 wherein the spring-loaded contact elements are electrical signal conductors.

8. The exchange system of claim 5 wherein the spring-loaded contact elements are axially reciprocable.

9. The exchange system of claim 1 wherein the latch means interfere slightly with a surface in the second exchange unit during disengagement of the mated exchange units to assist in urging the exchange units apart.

10. In a manipulator tool exchange unit system comprising first and second exchange units matable along an axis, the improvement comprising matable control signal conducting means mounted in each exchange unit coaxially with the axis of mating, so as to mate upon mating of the exchange units, the control signal conducting means further comprising axially reciprocable spring-loaded electrical signal conducting contact elements mounted in at least one of the matable exchange units.

11. In a manipulator tool exchange unit system comprising matable first and second exchange units having matable control signal conducting means mounted in each exchange unit, the improvement comprising the control signal conducting means having long axes aligned upon mating of the exchange units and at least one of the mating conducting means being an axially reciprocable spring-loaded electrical signal conducting contact element.

* * * * *

REEXAMINATION CERTIFICATE (1136th)
United States Patent [19]

Newell et al.

[11] B1 4,664,588
[45] Certificate Issued  Sep. 26, 1989

[54] APPARATUS AND METHOD FOR CONNECTING AND EXCHANGING REMOTE MANIPULABLE ELEMENTS TO A CENTRAL CONTROL SOURCE

[75] Inventors: Bruce D. Newell, Schenectady; Thomas J. Petronis, Clifton Park; Lawrence R. Krause, Niskayuna, all of N.Y.

[73] Assignee: Applied Robotics Inc., Latham, N.Y.

Reexamination Request:
No. 90/001,485, Mar. 30, 1988

Reexamination Certificate for:
Patent No.: 4,664,588
Issued: May 12, 1987
Appl. No.: 814,600
Filed: Jan. 3, 1986

Related U.S. Application Data

[63] Continuation of Ser. No. 588,080, Mar. 9, 1984.

[51] Int. Cl.⁴ ............................................. F16B 21/00
[52] U.S. Cl. ................................ 414/730; 901/29; 901/41
[58] Field of Search ................ 414/730; 901/29, 41, 901/42

[56] References Cited

U.S. PATENT DOCUMENTS

| | | | |
|---|---|---|---|
| 1,300,789 | 0/1919 | Tomlinson . | |
| 1,687,074 | 0/1928 | Wichert . | |
| 2,222,746 | 0/1940 | Kamenarovic | 285/110 |
| 2,476,249 | 0/1949 | Payne, Jr. | 414/4 |
| 2,605,330 | 0/1952 | Progress | 177/311 |
| 2,803,473 | 0/1957 | Hohmann | 284/18 |
| 2,861,701 | 0/1958 | Bergsland et al. | 901/30 X |
| 3,063,032 | 0/1962 | Bush | 339/45 |
| 3,066,805 | 0/1962 | Sullivan | 214/1 |
| 3,163,223 | 0/1964 | Bauer et al. | 166/66.5 |
| 3,171,549 | 0/1965 | Orloff | 214/1 |
| 3,195,095 | 0/1965 | Field | 339/16 |
| 3,247,978 | 0/1966 | Neumeier | 901/29 X |
| 3,247,979 | 0/1966 | Melton et al. | 214/1 |
| 3,277,421 | 0/1966 | Gobrecht | 339/48 |
| 3,280,991 | 0/1966 | Melton et al. | 214/1 |
| 3,381,977 | 0/1968 | Metzger | 285/26 |
| 3,433,370 | 0/1969 | Eisert et al. | 214/1 |
| 3,506,139 | 0/1970 | Cope et al. | 213/1.3 |
| 3,551,005 | 0/1970 | Brum | 285/10 |
| 3,602,869 | 0/1971 | Metz et al. | 339/15 |
| 3,624,721 | 0/1971 | Workman, Jr. | 285/93 X |
| 3,661,408 | 0/1972 | Gibbons | 285/920 X |
| 3,673,541 | 0/1972 | Volinskie | 339/16 |
| 3,701,549 | 0/1972 | Koomey et al. | 285/24 |
| 3,759,563 | 0/1973 | Kitamura | 294/88 |
| 3,817,281 | 0/1974 | Lewis et al. | 137/594 |
| 3,820,600 | 0/1974 | Baugh | 166/6 |
| 3,904,234 | 0/1975 | Hill et al. | 294/106 |
| 3,960,428 | 0/1976 | Naus et al. | 339/90 R |
| 4,011,437 | 0/1977 | Hohn | 235/151 |
| 4,080,025 | 0/1978 | Garnier | 339/16 |
| 4,227,853 | 0/1980 | Woodford et al. | 414/4 X |
| 4,365,928 | 0/1982 | Baily | 414/735 |
| 4,370,091 | 0/1983 | Gagliardi | 414/735 |
| 4,411,454 | 0/1983 | Nayler et al. | 285/26 |
| 4,488,241 | 0/1984 | Hutchins et al. | 364/513 |
| 4,549,846 | 0/1985 | Torii et al. | 414/729 |
| 4,636,135 | 1/1987 | Bancon | 414/730 |

FOREIGN PATENT DOCUMENTS

| | | |
|---|---|---|
| 36912 | of 1981 | European Pat. Off. . |
| 88559 | of 1983 | European Pat. Off. . |
| 92967 | of 1983 | European Pat. Off. . |
| 120275 | of 1984 | European Pat. Off. . |
| 3310070 | of 1984 | Fed. Rep. of Germany . |
| 3310192 | of 1984 | Fed. Rep. of Germany . |
| 543513 | of 1977 | U.S.S.R. ........................ 901/30 X |
| 1106968 | of 1968 | United Kingdom . |
| 2120634 | of 1983 | United Kingdom ............. 403/19 |

OTHER PUBLICATIONS

English Language abstract of EP 36912.
J. Gupton, "Nuclear Power Plant Emergency Damage Control Robot", Robotics Age, Mar./Apr. 1983, pp. 18–21.

*Primary Examiner*—Robert J. Spar
*Assistant Examiner*—D. Glenn Dayoan

[57] ABSTRACT

An exchange system is provided for connecting a remote, manipulable element, such as a robot arm tool gripper, to a central control source, such as a robot arm and its associated programmable control. An upper exchange unit attaches to the robot arm and receives control signals which pass through the body of the upper unit to a matable lower exchange unit. A plurality of lower exchange units are provided, each attached to an individual tool gripper and relaying control signals to the gripper. The mating upper and lower exchange units provide for serial connection of the robot arm to any desired one of an array of tool grippers and for communication of control signals through the mated units to each tool gripper without the need for separate control umbilicals between each tool gripper and the control signal source.

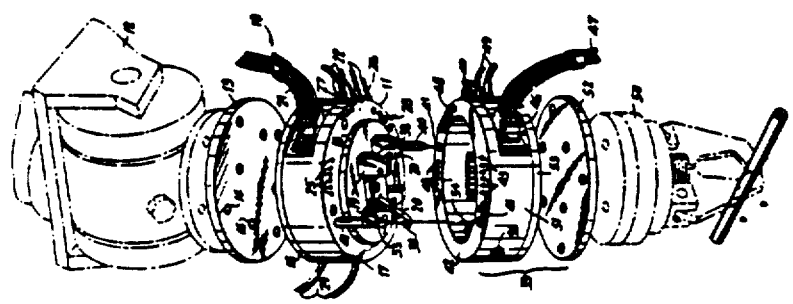

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

Claims 10 and 11 are determined to be patentable as amended.

New claim 12 is added and determined to be patentable.

10. In a manipulator tool exchange unit system comprising first and second exchange units *automatically* matable along an axis, the improvement comprising matable *electrical and pneumatic* control signal conducting means mounted in each exchange unit [coaxially with] *and extending parallel to* the axis of mating, so as to mate upon mating of the exchange units, the *electrical* control signal conducting means further comprising *a first plurality of parallel* axially *extending and* reciprocable spring-loaded electrical signal conducting contact pin elements mounted in [at least] one of the matable exchange units *and a second plurality of spatially corresponding electrical signal conducting contact elements mounted in the other of the exchange units, the contact elements of said first and second pluralities being arranged such that only an end portion of each spring loaded contact pin element of said first plurality contacts an end portion of a corresponding contact element of the second plurality* during mating of the exchange units such that said elements mate head-to-head, whereby the exchange units can be mated repeatedly with high control signal reliability.

11. In a manipulator tool exchange unit system comprising *automatically* matable first and second exchange units having matable control signal conducting means mounted in each exchange unit, the improvement [comprising] *wherein* the control signal conducting means *comprises multiple pairs of matable electrical signal conducting contact pin elements, each pair comprising a contact pin element in the first exchange unit and a contact pin element in the second exchange unit having long axes aligned upon mating of the exchange units and at least one of the* [mating conducting means] *contact pin elements of each pair* being an axially reciprocable spring-loaded electrical signal conducting contact *pin element, only an end portion of said spring loaded contact pin element making contact with an end portion of the other element of the pair during mating of the exchange units such that said elements mate head-to-head,* whereby the exchange units can be mated repeatedly with high control signal reliability.

*12. An automatic manipulator tool exchange system comprising:*

*a first exchange unit attachable to an end of a robot arm and in signal communication with a central control source and having control signal conducting means passing therethrough;*

*at least one second exchange unit matable with and releasably connectable to the first exchange unit and attachable to and in control signal communication with a remote manipulable element, the second exchange unit having control signal conducting means passing therethrough and matable with the control signal conducting means of the first exchange unit for passing of control signals to the remote manipulable element;*

*alignment means for ensuring initial alignment along a common axis and registration in a particular angular position about said axis of said first and second exchange units and for maintaining said alignment and angular registration throughout the matable connection of said first and second exchange units;*

*locking means in signal communication with and responsive to the central control source for connecting and disconnecting the aligned and angularly registered matable exchange units; and*

*wherein said control signal conducting means comprises a first plurality of electrical signal conducting contact elements mounted in one of said exchange units for mating with a second plurality of corresponding electrical signal conducting contact elements mounted in the other of said units, each of the contact elements in one of said pluralities having a long axis parallel to said common axis and being spring-loaded to positively mate head-to-head with a corresponding contact element of the other plurality upon mating connection of the exchange units, whereby the first and second exchange units can be mated repeatedly with high control signal reliability.*

* * * * *